US006379787B1

(12) United States Patent
Lu

(10) Patent No.: US 6,379,787 B1
(45) Date of Patent: Apr. 30, 2002

(54) COATING COMPOSITION FOR A PLASTIC FILM

(75) Inventor: Pang-Chia Lu, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/383,133

(22) Filed: Feb. 3, 1995

(51) Int. Cl.⁷ ............................................... B32B 27/30
(52) U.S. Cl. ..................... 428/323; 428/195; 428/326; 428/520; 428/516
(58) Field of Search .................. 428/326, 327, 428/331, 516, 520; 426/206, 208, 195, 323

(56) References Cited

U.S. PATENT DOCUMENTS

| | | | |
|---|---|---|---|
| 3,753,769 A | 8/1973 | Steiner | 117/122 H |
| 4,058,645 A | 11/1977 | Steiner | 428/331 |
| 4,058,649 A | 11/1977 | Steiner | 428/518 |
| 4,472,227 A | * 9/1984 | Toyoda et al. | 156/244.11 |
| 4,486,483 A | * 12/1984 | Caines | 428/195 |
| 4,560,614 A | 12/1985 | Park | 428/317.9 |
| 4,686,118 A | 8/1987 | Arai et al. | 427/261 |
| 4,749,616 A | 6/1988 | Liu et al. | 428/331 |
| 4,887,097 A | * 12/1989 | Akiya et al. | 346/135.1 |
| 4,956,241 A | 9/1990 | Chu et al. | 428/516 |
| 5,188,867 A | 2/1993 | Chu et al. | 427/173 |

FOREIGN PATENT DOCUMENTS

| | | | |
|---|---|---|---|
| EP | 0317166 | * | 5/1989 |
| JP | 55101452 A | | 8/1980 |
| JP | 56000398 A | | 1/1981 |
| JP | 58076268 A | | 10/1981 |
| JP | 58076268 A | | 5/1983 |
| JP | 58076270 A | | 5/1983 |
| JP | 58076272 A | | 5/1983 |

OTHER PUBLICATIONS

Aldrich Catalog Handbook of Fine Chemicals, pp1008–1009, 1994.*

* cited by examiner

Primary Examiner—Paul Thibodeau
Assistant Examiner—D. Lawrence Tarazano
(74) Attorney, Agent, or Firm—Dennis P. Santini; Rick F. James

(57) ABSTRACT

A coating for a polyolefin film is made from an acrylic polymer or ionomer resin and an ink receptive particulate such as a molecular sieve and/or a carbohydrate polymer such as cellulose, carboxymethyl cellulose or corn starch. The coating composition facilitates adhesion of ink to the polyolefin film.

15 Claims, No Drawings

COATING COMPOSITION FOR A PLASTIC FILM

FIELD OF THE INVENTION

The invention relates to a coating composition for a plastic film. More specifically, the invention relates to a coating composition which improves the physical characteristics of a plastic film. Even more specifically, the invention relates to a coating composition which renders a plastic film receptive to inks, even water based inks.

BACKGROUND OF THE INVENTION

Polyolefin films are very useful as protective packaging because they resist tearing and water penetration. However, a significant drawback to their use is the difficulties encountered in writing, with ink, on the film. Typically, polyolefin films have low surface energies which make them nonreceptive to certain inks, particularly water based inks. The water based inks tend to exhibit bad ink wetting properties, in which they fail to form a complete coating on the film; the ink forms into discrete beads, streaks and splotches on the film. Additionally, water based inks tend to dry slowly, smear easily and rub off once dry. These are serious problems particularly when plastic films are used for shipping articles which are often exposed to moisture and rough handling. To overcome these difficulties written matter is usually applied to a paper label which is then attached to the wrapping but this is inconvenient and presents recycling problems because paper recycling is usually incompatible with plastic recycling.

Various acrylic coatings are known for purposes of improving the heat seal characteristics of a film. These known acrylic coatings are not known to satisfactorily improve the ink adhesion properties of the film.

U.S. Pat. No. 3,753,769 discloses heat sealable acrylic coating compositions for use on plastic films. The described acrylic coating is formed from an interpolymer of an α-β monoethyleneically unsaturated carboxylic acid selected from the group consisting of acrylic acid, methacrylic acid and mixtures thereof; and neutral monomer esters comprising (1) methyl acrylate or ethyl acrylate; and (2) methyl methacrylate.

Inorganic particulate hot slip agents, such as colloidal silica and finely divided clay, have been described for use in acrylic terpolymer heat sealable coating formulations in amounts ranging from about 20 to 60 wt. % based on the terpolymer in U.S. Pat. Nos. 4,058,645 and 4,749,616. The hot slip agent improves the machineability of the heat sealable plastic films by enhancing the ability of the outer surfaces of the film to be easily removed from the jaws of a heat sealer and preventing the films from sticking to the metal surfaces of packaging machinery.

The acrylic coating of U.S. Pat. No. 4,058,645 is an acrylic terpolymer of methyl methacrylate, methyl acrylate and methacrylic acid. The acrylic coating includes an aqueous-alkali soluble rosin which improves the heat-seal characteristics of the coating and resistance to seal failure.

U.S. Pat.No. 5,188,867 describes a low coefficient of friction acrylic copolymer coating for plastic film which includes finely divided wax in amounts ranging from 30 to 150 wt. % based on the total weight of the copolymer, a finely divided inorganic solid, such as silica in an amount of 5 to 25 % by weight based on the total weight of the copolymer and talc or syloid in an amount ranging from 0 to 1 % based on the total weight of the copolymer.

SUMMARY OF THE INVENTION

The invention relates to an acrylic coating for a plastic film which comprises an amount of a particulate sufficient to improve the ink receptivity of the film.

It is an object of the invention to increase the ink receptivity of a plastic film.

It is a feature of the invention to incorporate a particulate into an acrylic coating for a plastic film which increases the ink receptivity of the film.

It is an advantage of the invention that when the particulates disclosed herein are incorporated, in an appropriate amount, into an acrylic coating that the film has increased ink receptivity.

DETAILED DESCRIPTION OF THE INVENTION

The coating composition of the present invention contains a significant proportion of a binder which is an acrylic polymer or ionomer resin. The acrylic polymer is usually made from an α, β-monoethyleneically unsaturated carboxylic acid selected from the group consisting of acrylic acid, methacrylic acid and mixtures thereof and neutral monomer esters selected from the group consisting of an alkyl acrylate ester and an alkyl methacrylate ester. The acrylic polymer coating is well known in the art and is described in U.S. Pat. Nos. 3,753,769; 4,058,645; and 4,749,616 which are incorporated herein by reference in their entireties. A commercially available acrylic polymer which is appropriate for use in this invention is sold by Valspar Corp under the product designations Acrylic 79XW318A or 89XW055. Other useful coatings which are contemplated include ionomer resins. Isomer resin is typically a copolymer of ethylene and a vinyl monomer with an acid group such as methacrylic acid or acrylic acid such as the kind sold under the name ADCOTE, specifically, ADCOTE 56220, which is sold by Morton International, specialty chemicals group and Michem 4983 which is available from Michelman Corp. Reference herein to the acrylic polymers include the ionomer resin.

An important feature of the invention is the inclusion of ink receptive particulates in amounts sufficient to increase the ink receptivity of the film. Appropriate ink receptive particulates include clathrates, compounds capable of trapping other substances within their own crystal lattice, such as molecular sieves.

Clathrates, specifically molecular sieves, have demonstrated utility in the coatings of this invention. Examples of typical clathrates are described in Merck Index, 11th Ed., page 365 which is incorporated herein by reference. Clathrates described therein include molecular sieves, cyclotriphosphazenes, Dianin's compound, hydroquinone, cyclodextrines, o-thymotide and deoxycholic acids. See also Kirk-Othmer *Encyclopedia of Chemical Technology*, Vol. 6 (Wiley-Interscience, New York, 3rd. Ed., 1979) pp. 178–189, which is incorporated herein by reference in its entirety.

Specific molecular sieves contemplated as ink receptive particulates include natural and synthetic zeolites (aluminosilicates) having a three-dimensional framework structure with channels and interconnecting cavities forming pores. Specifically contemplated zeolites include molecular sieve 13X, 3A, 4A and 5A. These zeolites are more specifically described in Fieser & Fieser, *Reagents for Organic Synthesis*, Vol. 1, 1967, p.p. 703–705 which is incorporated herein by reference in its entirety.

Other materials which have demonstrated utility as ink receptive particulates include carbohydrate polymers such as cellulose, corn starch and cotton fiber and mixtures thereof. Specific carbohydrate polymers include cellulose polymer, carboxy methyl cellulose and hydroxy ethyl cellulose. The carbohydrate polymer usually requires an amount of either the molecular sieve or silica for enhanced ink receptivity. Typically the ratio of carbohydrate polymer to molecular sieve ranges from about 1:1 to 1:2.

The coating composition, typically, includes finely divided wax. The wax can be a natural wax such as paraffin wax, microcrystalline wax, beeswax, carnauba wax, japan wax, montan wax, etc., or a synthetic wax such as hydrogenated castor oil, chlorinated hydrocarbon wax, or long chain fatty amide. When wax is employed it can be present in amounts ranging from about 2 to about 40% by weight based on the total weight of the acrylic polymer and preferably from about 4 to about 20% by weight based on the total weight of the acrylic polymer.

The coating composition can, optionally, contain a finely divided inorganic solid material such as silica, talc, diatomacious earth, calcium silicate, bentonite and finely divided clays in amounts ranging from about 10 to about 60% by weight based on the total weight of the acrylic polymer, specifically from about 15 to about 50% by weight based on the total weight of the acrylic polymer.

Alkylated melamine crosslinking agents can also be used in the coating composition. These crosslinking agents are generally partially methylated melamine formaldehyde and polymeric and have a degree of polymerization of about 1–3. The following are typical melamine crosslinking agents that are commercially available from American Cyanamid Company: CYMEL 373, a polymeric partially methylated melamine formaldehyde resin having a degree of polymerization of 2.3; CYMEL 385, a polymeric partially methylated melamine formaldehyde resin having a degree of polymerization of 2.1. The following crosslinking agents are available from Monsanto Chemical Company: RESIMINE 714, a polymeric partially methylated melamine formaldehyde resin; RESIMINE 730 and 731 polymeric partially methylated melamine fomaldehyde resins with a degree of polymerization of 1.6; RESIMINE 735 and 740, polymeric partially methylated melamine formaldehyde resins having a degree of polymerization of 1.7 and 1.6, respectively. Another commercially available crosslinking agent is PAREZ 613, a methylated melamine formaldehyde, available from American Cyanamid Company. Other materials that can be employed for crosslinking include glyoxal and borax. The crosslinking agent is usually used in an amount ranging from about 2% to about 50% by weight based on the entire weight of the acrylic polymer, specifically from about 10% to about 30% by weight based on the entire weight of the acrylic polymer. An acid catalyst is usually used along with the crosslinking agent. Appropriate acid catalysts include ammonium sulfate, ammonium chloride, sulfuric acid, nitric acid, hydrochloric acid, phosphoric acid and ammonium nitrate, etc. The acid catalyst is usually employed in an amount ranging from about 0.5% to about 3% based on the entire weight of the acrylic polymer.

The coating composition of this invention can be applied to the surface of the polyolefin film in any appropriate manner. The known techniques for applying coatings to films include gravure coating, roll coating, dipping and spraying and any of these techniques would be appropriate for coating the film of this invention. The coating can be applied to the film after it is formed, usually after it has been oriented by stretching in at least one direction.

Typically, the film is formed by extruding a polyolefin resin, such as polypropylene, through a flat sheet extruder die at a temperature ranging from between about 200 to about 250° C., casting the film onto a cooling drum and quenching the film. The sheet is then stretched about 3 to about 7 times in the machine direction (MD) orienter followed by stretching about 5 to about 10 times in the transverse direction (TD) orienter.

Either surface of the film can be treated by surface treatment which improves wettability and adhesion such as by flame or corona treatment.

Typically, the surface of the film, to which the acrylic coating of this invention is applied, is primed so that the coating will strongly adhere to the film. There are many known priming methods. One such method employs polyethyleneimine.

The coating composition of this invention can be applied onto the surface of the film from a non-aqueous solution of the composition using, for example, various organic solvents such as alcohols, ketones, esters and the like. However, since the coating compositions contain particulate materials and since these materials can be difficult to keep well dispersed in organic solvents, it is usually applied in an aqueous solution and often from an alkaline aqueous solution.

The coating composition comprises from about 90 to 30 wt. %, usually 80 to 40 wt. % binder (the acrylic polymer or ionomer resin) and about 10 to 70 wt. %, usually, at least 20 to 60 wt. %, of the above-defined ink receptive particulates.

The coating composition of the present invention is usually prepared to have a total solids content of from about 10% to about 50%, a pH ranging from about 6 to about 10 and a viscosity (Brookfield) of about 10 to about 2500 cP. The coating weight, typically, ranges from about 1 to 5 g/msi (grams per thousand square inch).

EXAMPLE 1

An aqueous coating dispersion was prepared in a flask by mixing a commercially available acrylic emulsion solution with the particulates defined in each of the following examples. The coating composition was applied to a corona treated 1 mil oriented polypropylene film by a gravure coater. The coated web was dried at 100° C.

In the following examples, a series of coated films were prepared from various coating compositions made by adding particulates to the aqueous acrylic dispersion and preparing the film as described in Example 1.

EXAMPLE 2

In this example, the ink adhesion performance of films coated with the acrylic coatings of example 1 but each containing a different molecular sieve, e.g. 13X, 3A, 4A and 5A, was compared with films coated with the same acrylic coating except it contained silica rather than a molecular sieve. Each coating composition contained 100 parts of acrylic polymer; 5 parts (per 100 parts of acrylic polymer or phr) of wax. The amount of the solids added to the coating compositions each film is described in Table I. The coating weight was 1.9 g/msi.

TABLE I

| Film No. | | 1 | 2 | 3 | 4 | 5 | 6 |
|---|---|---|---|---|---|---|---|
| Additive, phr | | | | | | | |
| Molecular Sieve: | 13X | — | 40 | — | — | — | — |
| | 3A | — | — | 40 | — | — | — |
| | 4A | — | — | — | 40 | — | — |
| | 5A | — | — | — | — | 40 | — |
| Silica | | — | — | — | — | — | 40 |

In the following Table II, the ink adhesion performance of the films of Table I is reported. The ink adhesion performance was determined by considering two characteristics: 1. whether the ink could be rubbed off with the tester's finger two minutes after application and 2. how well the ink wet the film, i.e. whether a continuous, neat, dark mark was made or whether the ink wet the film poorly by beading, blotching or streaking. The performance was determined by visual observation and assignment of a number ranging from 1 to 5 in accordance with the following:

| ink rub off | | ink wetting | |
|---|---|---|---|
| Rating | Observation | Rating | Observation |
| 5 | none | 5 | good |
| 4 | slight | 4 | acceptable |
| 3 | partial | 3 | partial |
| 2 | 80% | 2 | sporadic |
| 1 | 100% | 1 | poor |

TABLE II

INK ADHESION PERFORMANCE

| Film No. | 1 | 2 | 3 | 4 | 5 | 6 |
|---|---|---|---|---|---|---|
| Solvent-based ink[1] | | | | | | |
| ink rub off | 4 | 5 | 5 | 5 | 5 | 5 |
| ink wetting | 5 | 5 | 5 | 5 | 5 | 5 |
| Oil-based ink[2] | | | | | | |
| ink rub off | 4 | 5 | 5 | 5 | 5 | 5 |
| ink wetting | 3 | 5 | 5 | 5 | 5 | 5 |
| Water-based ink I[3] | | | | | | |
| ink rub off | 1 | 5 | 5 | 5 | 5 | 3 |
| ink wetting | 1 | 5 | 5 | 5 | 5 | 3 |
| Typewriter ink[4] | | | | | | |
| ink rub off | 1 | 5 | 5 | 5 | 5 | 2 |
| ink wetting | 4 | 5 | 5 | 5 | 5 | 4 |

[1]Ink adhesion was tested by writing on the film with a SHARPIE FINE POINT pen which contained solvent based permanent ink.
[2]Ink adhesion was tested by writing on the film with a PAPERMATE pen containing oil-based ink.
[3]Ink adhesion was tested by writing on the film with a BEROL F-30 BOLDLINER pen containing water-based ink.
[4]Ink adhesion was tested by typing on the film using IBM typewriter ink.

As demonstrated by the data of Table II, each of the film samples having a molecular sieve-containing coating achieved high ratings (films 2–5) while film 6 which contained only silica achieved low ratings in both water-based ink and typewriter ink adhesion performance.

EXAMPLE 3

In this example, the ink adhesion performance of films coated with the acrylic coating of Example 1 to which was added molecular sieve 13X was compared to a film coated with the same acrylic coating except cellulose powder was added instead of the molecular sieve. Each coating composition contained acrylic polymer and 5 phr wax. The film coating weight ranged from 1.5 to 2 g/msi. The amount of particulates added to the coating compositions is described in Table III. The performance of the films is reported in Table IV. The amounts of $TiO_2$ and crosslinking agent, CYMEL-385 together with an acid catalyst, $NH_4Cl$, are also set forth in Table III.

TABLE III

| Film No. | 7 | 8 | 9 | 10 | 11 | 12 | 13 | 14 | 15 |
|---|---|---|---|---|---|---|---|---|---|
| molecular sieve 13X | — | 20 | 40 | 20 | 40 | — | — | — | — |
| cellulose powder | — | — | — | — | — | 20 | 40 | 20 | 40 |
| $TiO_2$ | — | — | — | — | — | 40 | — | 20 | 40 |
| Cymel-385 | — | 10 | 10 | — | — | 10 | 10 | — | — |
| $NH_4Cl$ | — | 1 | 1 | — | — | 1 | 1 | — | — |

TABLE IV

Ink Adhesion Performance

| Film No. | 7 | 8 | 9 | 10 | 11 | 12 | 13 | 14 | 15 |
|---|---|---|---|---|---|---|---|---|---|
| Solvent-based ink | | | | | | | | | |
| ink-rub off | 1 | 5 | 5 | 5 | 5 | 5 | 5 | 5 | 5 |
| ink wetting | 5 | 5 | 5 | 5 | 5 | 5 | 5 | 5 | 5 |
| Oil-based ink | | | | | | | | | |
| ink rub-off | 2 | 5 | 5 | 5 | 5 | 5 | 5 | 5 | 5 |
| ink wetting | 1 | 5 | 5 | 5 | 5 | 5 | 5 | 5 | 5 |
| Water-based Ink I | | | | | | | | | |
| ink rub-off | 1 | 5 | 5 | 5 | 5 | 1 | 1 | 1 | 1 |
| ink wetting | 1 | 3 | 3 | 3 | 3 | 1 | 1 | 1 | 1 |
| Water-based ink II[1] | | | | | | | | | |
| ink rub-off | 1 | 5 | 5 | 5 | 5 | 1 | 1 | 1 | 3 |
| ink wetting | 1 | 5 | 5 | 5 | 5 | 4 | 4 | 1 | 4 |
| Typewriter ink | | | | | | | | | |
| ink rub-off | 1 | 4 | 5 | 5 | 5 | 1 | 1 | 1 | 3 |
| ink wetting | 4 | 4 | 5 | 5 | 5 | 1 | 1 | 1 | 3 |

[1]Ink adhesion in the Water-based ink II test was determined by writing on the film using a Faber Castell brand "UNI-BALL MICRO" pen which contains water-based ink.

The data in Table IV show an improvement in films coated with an acrylic coating which contained a molecular sieve (films 8–11) over films made with an acrylic coating which contained cellulose (films 12–15).

EXAMPLE 4

In this example, the ink adhesion performance of films coated with the acrylic coating of Example 1 containing molecular sieve 13X and cellulose powder was compared with that of films coated with the same acrylic coating except containing only cellulose powder. Each coating composition contained acrylic polymer and 5 phr wax. The coating weight of the films was 1.6 g/msi. The amount of the solids (in phr) added to the coating compositions is described in Table V. In some of the examples varying amounts of $TiO_2$ and a crosslinking agent, CYMEL-385 and an acid catalyst, $NH_4Cl$ were used. The ink performance of each film is reported in Table VI.

TABLE V

| Film. No. | 16 | 17 | 18 | 19 | 20 |
|---|---|---|---|---|---|
| molecular sieve 13X | — | — | 100 | 100 | 100 |
| Cellulose powder | — | 100 | — | 50 | 100 |
| Cymel-385 | — | — | — | — | 30 |
| $NH_4Cl$ | — | — | — | — | 2 |

TABLE VI

Ink Adhesion Performance

| Film No. | 16 | 17 | 18 | 19 | 20 |
|---|---|---|---|---|---|
| Typewriter ink | | | | | |
| ink rub off | 1 | 3 | 5 | 5 | 5 |
| ink wetting | 4 | 5 | 5 | 5 | 5 |
| Oil-based ink | | | | | |
| ink rub off | 5 | 5 | 5 | 5 | 5 |
| ink wetting | 5 | 5 | 5 | 5 | 5 |
| Solvent-based ink | | | | | |
| ink rub off | 5 | 5 | 5 | 5 | 5 |
| ink wetting | 5 | 5 | 5 | 5 | 5 |
| Water-based ink I | | | | | |
| ink rub off | 1 | 1 | 3 | 3 | 4 |
| ink wetting | 1 | 2 | 5 | 5 | 5 |
| Water-based ink II | | | | | |
| ink rub off | 1 | 3 | 3 | 5 | 5 |
| ink wetting | 1 | 2 | 5 | 5 | 5 |

The results of Table VI show that cellulose in combination with a molecular sieve (films 19–20) improved ink adhesion as compared to cellulose alone (film 17) or a molecular sieve used alone (film 18).

EXAMPLE 5

In this example, the ink adhesion performance of films coated with the coating of Example 1 containing silica and cellulose polymer was compared with that of films coated with the same coating except containing only silica. Different forms of carbohydrate polymer were used in the coating: cellulose (commercially available from Aldrich Chemical Co. (Catalog No. 31069-7)), carboxy methyl cellulose (CMC) and pulp, which was derived by pulverizing bathroom tissue mixed with water in a Waring blender. Each coating composition contained acrylic polymer; 8 phr wax, and 0.5 phr of talc. The coating weight of the films was 1.6 g/msi. The amount of other solids added to the coating compositions is described in Table VII. The ink adhesion performance results are reported in Table VIII. In some of the examples varying amounts of a crosslinking agent, CYMEL-385 employed together with an acid catalyst, NH$_4$Cl were used.

TABLE VII

| Film No. | 21 | 22 | 23 | 24 | 25 | 26 | 27 |
|---|---|---|---|---|---|---|---|
| silica | 20 | 20 | 20 | 20 | 20 | 20 | 20 |
| cellulose | — | 10 | 10 | 20 | 20 | — | — |
| CMC[1] | — | — | — | — | — | 10 | — |
| pulp[2] | — | — | — | — | — | — | 10 |
| cymel-385 | — | — | 20 | — | 20 | 20 | 20 |
| NH$_4$Cl | — | — | 2 | — | 2 | 2 | 2 |

[1]CMC: Carboxy methyl cellulose from Aldrich Chemical Co. (Cat#36038-4)
[2]bathroom tissue fiber

TABLE VIII

Ink Adhesion Properties

| Film No. | 21 | 22 | 23 | 24 | 25 | 26 | 27 |
|---|---|---|---|---|---|---|---|
| Water-based ink I | | | | | | | |
| ink rub-off | 1.5 | 3 | 3 | 2 | 3 | 4 | 2 |
| ink wetting | 1.5 | 3 | 2 | 2 | 3 | 3.5 | 2 |
| Oil-based ink | | | | | | | |
| ink rub-off | 3 | 4 | 4 | 4 | 4 | 4.5 | 3.5 |
| ink wetting | 4 | 4 | 4 | 4 | 4 | 4.5 | 4 |
| coating appearance | clear | light haze | light haze | light haze | light haze | hazy, lines | clear, spots |

The results reported in Table VIII demonstrate that film coatings containing cellulose, CMC or pulp and silica (films 22–27) performed much better in the ink adherence tests than the film coating that contained only silica (film 21).

EXAMPLE 6

This example demonstrates that an ionomer resin can be used instead of an acrylic polymer. The films of this example were made in accordance with Example 1, except that ADCOTE-56220 ionomer resin was used instead of acrylic. The components of the coating of this example are reported in Table IX.

TABLE IX

IONOMER COATINGS

| Film No. | 28 | 29 | 30 | 31 |
|---|---|---|---|---|
| Silica | 0.8 | 0.8 | 0.8 | 0.8 |
| Cellulose | 10 | 20 | 10 | 20 |
| Cymel-35 | — | — | 20 | 20 |
| NH$_4$Cl | — | — | 2 | 2 |

The performance of the films of Table IX is reported below in Table X.

TABLE X

| Film No. | 28 | 29 | 30 | 31 |
|---|---|---|---|---|
| Water based ink I | | | | |
| ink rub-off | 2 | 2 | 2 | 3 |
| ink wetting | 2 | 3 | 3 | 3 |
| Oil-based ink | | | | |
| ink rub-off | 4 | 4 | 4 | 4 |
| ink wetting | 4 | 4 | 4 | 4 |

What is claimed is:

1. A film structure having enhanced adhesion to water-based ink, the film structure comprising a polyolefin film having a surface which is surface treated and having, on the treated surface, a coating which consists essentially of: p1 (a) about 30 to 90 wt % of an acrylic polymer comprising;
    (i) an α, β-monoethylenically unsaturated carboxylic acid and a neutral monomer ester; or
    (ii) an ionomer resin which is a copolymer of ethylene and vinyl monomer with an acid group; and
(b) about 10 to 70 wt % of an ink receptive particulate selected from the group consisting of a molecular sieve and a mixture of a molecular sieve and silica.

2. The film as defined in claim 1, wherein the ink receptive particulate is a molecular sieve.

3. The film as defined in claim 2, wherein the molecular sieve is a zeolite.

4. The film as defined in claim 3, wherein the zeolite is a zeolite selected from the group consisting of a zeolite of type 13X, 3A, 4A, and 5A.

5. The film as defined in claim 1, wherein the coating further comprises:

one or more finely divided materials selected from the group consisting of wax and $TiO_2$.

6. The film as defined in claim 1, wherein the coating further comprises:

a crosslinking agent.

7. The film as defined in claim 6, wherein the crosslinking agent is an alkylated melamine crosslinking agent.

8. The film as defined in claim 6, wherein the crosslinking agent is a polymeric partially methylated melamine formaldehyde resin.

9. The film as defined in claim 6, wherein the coating further comprises:

an acid catalyst for the crosslinking agent.

10. The film as defined in claim 9, wherein the acid catalyst is selected from the group consisting of ammonium sulfate, ammonium chloride, sulfuric acid, nitric acid, hydrochloric acid, phosphoric acid, and ammonium nitrate.

11. The film as defined in claim 1, further comprising:

a primer layer located between the coating and the treated surface of the polyolefin film.

12. The film as defined in claim 1, wherein the α, β-monoethylenically unsaturated carboxylic acid is selected from the group consisting of acrylic acid, methacrylic acid, and a mixture of acrylic acid and methacrylic acid.

13. The film as defined in claim 1, wherein the neutral monomer ester is selected from the group consisting of an alkylacrylate ester, an alkylmethacrylate ester, and a mixture of an alkylacrylate ester and an alkylmethacrylate ester.

14. The film as defined in claim 1, wherein the acid group with the vinyl monomer is selected from a group consisting of an acrylic acid, a methacrylic acid, and a mixture of an acrylic acid and a methacrylic acid.

15. The film as defined in claim 1, wherein the coating composition further comprises:

one or more of an inorganic solid material selected from the group consisting of silica, talc, diatomacious earth, calcium silicate, bentonite, and finely divided clays.

* * * * *